(12) United States Patent
Galand et al.

(10) Patent No.: US 6,628,670 B1
(45) Date of Patent: Sep. 30, 2003

(54) METHOD AND SYSTEM FOR SHARING RESERVED BANDWIDTH BETWEEN SEVERAL DEPENDENT CONNECTIONS IN HIGH SPEED PACKET SWITCHING NETWORKS

(75) Inventors: Claude Galand, La Colle sur Loup (FR); Marcel Villaflor, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,796

(22) Filed: Oct. 29, 1999

(51) Int. Cl.⁷ .............................................. H04L 12/56
(52) U.S. Cl. ..................... 370/468; 370/409; 370/477
(58) Field of Search ................................ 370/351, 352, 370/353, 389, 391, 392, 400, 409, 410, 229, 230, 232, 235, 464, 465, 468, 477

(56) References Cited

U.S. PATENT DOCUMENTS

| | | | | |
|---|---|---|---|---|
| 5,600,638 A | * | 2/1997 | Bertin et al. | 370/351 |
| 5,815,492 A | * | 9/1998 | Berthaud et al. | 370/234 |
| 5,881,050 A | * | 3/1999 | Chevalier et al. | 370/230 |
| 5,940,372 A | * | 8/1999 | Bertin et al. | 370/238 |
| 6,011,804 A | * | 1/2000 | Bertin et al. | 370/468 |
| 6,038,212 A | * | 3/2000 | Galand et al. | 370/216 |
| 6,256,309 B1 | * | 7/2001 | Daley et al. | 370/395.43 |
| 6,262,974 B1 | * | 7/2001 | Chevalier et al. | 370/232 |
| 6,282,197 B1 | * | 8/2001 | Takahashi et al. | 370/395.1 |
| 6,321,260 B1 | * | 11/2001 | Takeuchi et al. | 709/223 |
| 6,400,681 B1 | * | 6/2002 | Bertin et al. | 370/218 |

* cited by examiner

Primary Examiner—Melvin Marcelo
Assistant Examiner—Derrick W Ferris
(74) Attorney, Agent, or Firm—Winstead, Sechrest & Minick, P.C.; Carlos Munoz-Bustamante

(57) ABSTRACT

The present application discloses a method and system of sharing reserved bandwidth among several connections issuing from a same physical port in an origin node of a packet switching communication network comprising a plurality of nodes interconnected with transmission links. At each request for establishing a connection i from an origin node to a destination node, the dependent connection management process:

selects for connection i a routing path comprising one or a plurality of links from the origin node to the destination node:

identifies on the selected path all consecutive links starting from the origin node and shared with another connection issuing from the same physical port;

reserves on each link of these identified consecutive links an aggregate bandwidth for all connections issuing from the same physical port, said aggregate bandwidth being less than the sum of the bandwidth reserved for each connection considered individually.

10 Claims, 13 Drawing Sheets

DEPENDENT CONNECTION ESTABLISHMENT

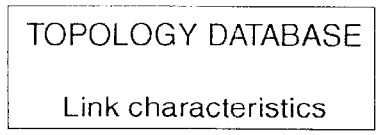

TOPOLOGY DATABASE

Link characteristics

| CHARACTERISTICS | | LINK VALUES | | | |
|---|---|---|---|---|---|
| NAME | DESCRIPTION | A | B | ... | N |
| C | Total capacity (bps) | $C_A$ | $C_B$ | ... | $C_N$ |
| rf | Reservable fraction (%) | $rf_A$ | $rf_B$ | ... | $rf_N$ |
| $\widehat{C}_R$ | Total reserved bandwith (bps) | $\widehat{C}_{R.A}$ | $\widehat{C}_{R.B}$ | ... | $\widehat{C}_{R.N}$ |
| $M_{NR}$ | Total bandwith used by NR traffic (bps) | $M_{NR.A}$ | $M_{NR.B}$ | ... | $M_{NR.N}$ |
| mps | Maximun packet size (bytes) | $mps_A$ | $mps_B$ | ... | $mps_N$ |

FIG. 6

NBBS CONNECTION ESTABLISHMENT

DEPENDENT CONNECTION ESTABLISHMENT ACCORDING TO US APPLICATION N° 97131

DEPENDENT CONNECTION ESTABLISHMENT

CONNECTIONS ISSUED FROM PORT P AT NODE A

| Port P | | |
|---|---|---|
| Connection index | Path length | list of links along the Path |
| 1 | 4 | 6, 8, 14, 27 |
| 2 | 3 | 6, 9, 19 |
| 3 | 6 | 3, 1, 12, 16, 22, 33 |
| 4 | 4 | 6, 9, 18, 22 |
| new connection 5 | 4 | 6, 8, 14, 25 |
|  |  |  |

PATH TABLE $PT_p$ AT NODE A

FIG. 11

METHOD AND SYSTEM FOR SHARING RESERVED BANDWIDTH BETWEEN SEVERAL DEPENDENT CONNECTIONS IN HIGH SPEED PACKET SWITCHING NETWORKS

TECHNICAL FIELD

The present invention relates to bandwidth reservation in high speed packet networks and more particularly to a method and system for sharing reserved bandwidth between several virtual logical connections issuing from a same port attaching external devices.

BACKGROUND ART
HIGH SPEED PACKET SWITCHING NETWORKS

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video and traffic among channel attached hosts, business, engineering workstations, terminals, and small to intermediate file servers. This vision of a high speed multi-protocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architecture a set of requirements in term of performance and resource consumption which can be summarized as follows:

- a very high throughput and a very short packet processing time.
- a very large flexibility to support a wide range of connectivity options,
- an efficient flow and congestion control.

THROUGHPUT AND PROCESSING TIME

One of the key requirement of high speed packet switching networks is to reduce the end to end delay in order to satisfy real-time delivery constraints and to achieve the necessary high nodal throughput for the transport of voice and video. Increases in link speeds have not been matched by proportionate increases in the processing speeds of communication nodes and the fundamental challenge for high speed networks is to minimize the processing time and to take full advantage of the high speed/low error rate technologies, most of the transport and control functions provided by the new high bandwidth network architectures are performed on an end to end basis. The flow control and particularly the path selection and bandwidth management processes are managed by the access points of the network which reduces both the awareness and the function of the intermediate nodes.

CONNECTIVITY

In high speed networks, the nodes must provide a total connectivity. This includes attachment of the user's devices, regardless of vendor or protocol, and the ability to have the end user communicated with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

CONGESTION AND FLOW CONTROL

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth. An ideal network should be able to transmit an useful traffic directly proportional to the traffic offered to the network and this as far as the maximum transmission capacity is reached. Beyond this limit, the network should operate at its maximum capacity whatever the demand is.

DEPENDENT CONNECTIONS

Private Network (PN) and Value-Added Network (VAN) service providers usually build their networks upon carrier transmission facilities. The expense for carrier transmission facilities represents an important part (about 30% to 60%) of the PN's or VAN's total operating expense. As such, their profits are directly related to their ability to minimize monthly transmission expenses while continually meeting their customers' end-to-end communications needs. Nodal equipment that can utilize the transmission facilities more efficiently than traditional carrier systems are typically selected by PNs and VANs.

Today, the replacement of traditional Time Division Multiplex (TDM) equipment by high speed packet switching equipment has significantly reduced the amount of transmission facilities needed in a Private Network (PN) or in a Value-Added Network (VAN). But much like TDM networks, packet switching networks approach falls short of reducing the amount of transmission facilities (transmission trunks) required in the backbone network. The reason for this is that most packet switching network architectures assume that all incoming traffic streams are "independent" with respect to each other. That is, any customer device attached to the network can provide incoming traffic to the network at any instant of time. This is not true for logical virtual connections as in the case of Frame Relay (FR), Local Area Network (LAN), or Asynchronous Transfer Mode (ATM) traffic. In fact, the logical connections of a FR, LAN or ATM attached device must consider the traffic sources from all logical virtual connections established on a given physical port as "dependent". When a logical virtual connection is bursting a traffic stream, no other logical virtual connection can burst at the same time.

A network architecture such as the NBBS architecture described in IBM's publication entitled "Networking Broadband Services (NBBS)—Architecture Tutorial" IBM ITSC, June 1995 GG24-4486-00, reserves for virtual Frame Relay (FR) connections more bandwidth than necessary on the backbone network. This occurs because NBBS considers each Data Link Connection Identifier (DLCI) (refer to Frame Relay core aspects ANSI T1.618-1991 and ITU-T Q.922 Annex A) as an independent traffic source, and reserves bandwidth on the backbone network accordingly.

FIG. 4 illustrates virtual Frame Relay/ATM (FR/ATM) connections between four nodes, named A, B, C, and D. Digital Terminal Equipment are connected to ports in these nodes by means of access links. From the Frame Relay/ATM port in origin node A, three virtual logical connections are established respectively towards destination ports B, C and D. Assuming in this example that the traffic is the same for each connection:

R (Access Rate)=2 Mbps,

CIR (Committed Information Rate)=300 kbps, $B_c$ (Burst Committed)=4 kbytes the bandwidth reserved on a trunk with a multiplexing buffer of 64 kbytes in order to guarantee a packet loss probability of $\epsilon=5\times10^{-8}$, is approximately 700 kbps for each connection.

The bandwidth reserved by the NBBS architecture on a trunk to support a connection is defined according to the following equation:

$$\hat{c} = R \frac{y - X + \sqrt{[y - X]^2 + 4X\rho y}}{2y} \simeq 700 \text{ kbps}$$

where:

$X = 64000 \text{ bytes} \times 8 = 512000 \text{ bits}$ (size of the buffer where packets are queued), $b = \frac{B_c}{R} = \frac{4 \text{ kbytes} \times 8}{2048 \text{ kbps}} = 0.16 \text{ ms (average burstiness)},$ $y = \ln(1/\varepsilon)b(1-\rho)R,$ and $\rho = CIR/R = 300 \text{ kbps}/2048 \text{ kbps} \simeq 0.15.$ Therefore, the bandwidth reserved on each trunk is given in the table below:

| Trunk number | Number of connections on trunk | Amount of bandwidth reserved by NBBS (kbps) |
| --- | --- | --- |
| Trunk 1 | 3 | 2100 |
| Trunk 2 | 1 | 700 |
| Trunk 3 | 2 | 1400 |
| Trunk 4 | 1 | 700 |
| Trunk 5 | 1 | 700 |

This example shows that the total bandwidth that should be reserved for 3 connections on Trunk 1 is about 2100 kbps (3 connections at 700 kbps). The value is higher than the access rate (R=2 Mbps) of the physical port (FR/ATM port A) supporting these connections. This situation is clearly not acceptable. In the simple case where a physical port is fully loaded with 7 connections (7×300 kbps=2 Mbps) and where all the connections issuing from said port are transmitted over a single trunk (Trunk 1), the bandwidth requirement is about 4.9 Mbps (7×700 kbps), while it is clear that the 2 Mbps stream produced by said port can be transmitted over a 2 Mbps trunk. Again, this occurs because NBBS considers each connection as an independent traffic source and supposes that all connections can be bursty at the same time. Considering this worst case, NBBS reserves 4.9 Mbps to be sure to be able to transmit 2 Mbps.

NON PUBLISHED U.S. PATENT APPLICATION SER. NO. 97,131

Non published U.S. patent application Ser. No 97,131 (IBM's reference FR 9 95 035) entitled "Method and System for Sharing Reserved Bandwidth Between Several Dependent Connections in High Speed Packet Switching Networks" (Galand et al.) discloses a Dependent Connection Bandwidth Management method and system for taking advantage of the property of dependent virtual logical connections in a packet switching communication network comprising a plurality of nodes interconnected with transmission trunks. More particularly, the object of this application is to share the reserved bandwidth between several connections issuing from a same physical access port. An aggregate bandwidth is reserved for all connections issuing from the same physical port, this aggregate bandwidth is defined as being less than the sum of the bandwidth reserved for each connection considered individually. In a network where the bandwidth reserved for an individual connection is equal to the equivalent capacity of the connection, the aggregate bandwidth reserved for all dependent connections is defined as a function of:

the mean bit rate of the aggregation of connections issued from said port, and the mean burst duration of the aggregation of connections issued from said port.

The Dependent Connection Bandwidth Management process as described in the specifications is based on:

1. an accounting per port of all connections established on every link in the network.
2. a modification of the Path Selection algorithm in access nodes,
3. an insertion of additional fields in the connection set-up message, and
4. a modification of the Transit Connection Manager (TCM) algorithm within Transit nodes.

This solution reduces the bandwidth required for the dependent connections in the backbone network, while still guaranteeing an end-to-end quality-of-service. However, this solution is complex to implement and resource consuming because based on a set of algorithms implemented in both access nodes (in particular in the Path Selection), and transit nodes (in the Transit Connection Managers (TCM)).

SUMMARY OF THE INVENTION

The object of the present application is to provide an improved method and system for saving bandwidth on links taking advantage of the property of dependent connections while limiting the resources required for establishing connections in both access and transit nodes.

It is another object of the present application to reduce the processing time necessary to establish connections and in particular the time for selecting a routing path. It is another object of the present application to make easier the migration of existing networks and the coexistence of the present invention with other networks architectures.

According to the present invention dependent connections are managed:

independently of the Path Selection algorithm, and only in access nodes.

At each request for establishing a connection i from an origin node to a destination node, the dependent connection management process:

selects for connection i a routing path comprising one or a plurality of links from the origin node to the destination node;

identifies on the selected path all consecutive links starting from the origin node and shared with another connection issuing from the same physical port;

reserves on each link of these identified consecutive links an aggregate bandwidth for all connections issuing from the same physical port, said aggregate bandwidth being less than the sum of the bandwidth reserved for each connection considered individually.

Two tables are defined for each port p:

a Dependent Connection Table $DCT_p$ comprising for each link in the network, information required to manage the bandwidth and the dependency of connections issuing from the port;

a Path Table $PT_p$ with the links comprised in the selected routing path of each connection issuing from the port.

BRIEF DESCRIPTION OF THE DRAWINGS

FIG. 6 shows the link characteristics stored in the Topology Database.

FIG. 11 shows the Path Table structure at node A for port p according to the present invention.

DESCRIPTION OF THE PREFERRED EMBODIMENT

HIGH SPEED COMMUNICATIONS

Figure 2:
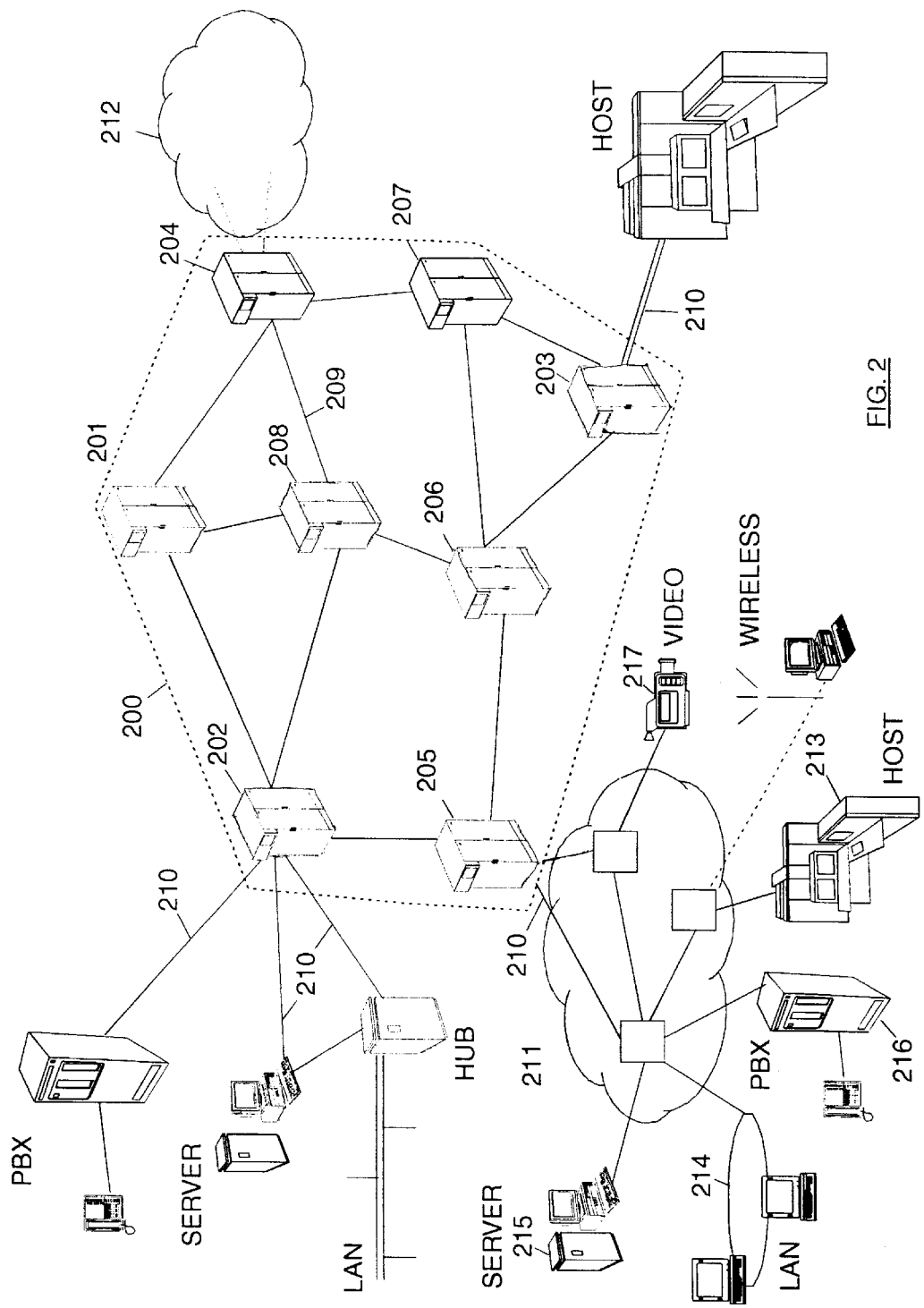
FIG. 2 shows a typical model of high speed packet switching network including the nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch eXchange 216) or video servers (217). These user networks, spread in different establishments, need to be interconnected through wide area transport facilities and different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets toward their final destination at the highest possible rate. The present invention belongs essentially to the latter category and more particularly to the fast packet switching network architecture detailed in the following paragraphs.

HIGH PERFORMANCE PACKET SWITCHING NETWORKS

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node (202) interfaces respectively a Private Branch exchange (PBX), an application server and a hub through three Ports and communicates through the network by means of the adjacent Transit Nodes (201), (205) and (208).

SWITCHING NODES

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes provide ancillary services such as:

the determination of routing paths for packets originated in the node, directory services like retrieving and updating information about network users and resources, the maintaining of a consistent view of the physical network topology, including link utilization information, and the reservation of resources at access points of the network.

According to the present invention, these ancillary services include:

the storage within the node of alternate paths, the updating of these paths.

Each Port is connected to a plurality of user processing equipment, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control, Routing and Redundancy Check Fields.

The Routing Fields contain all the information necessary to route the packet through the network (200) to the destination node to which it is addressed. These fields can take several formats depending on the routing mode specified (connection oriented or connectionless routing mode . . . ).

The Control Fields include, among other things, an encoded identification of the protocol to be used for interpreting the Routing Fields.

The Redundancy Check Fields are used to check for errors in the header itself. If an error is detected, the packet is discarded.

ROUTING POINTS

Figure 3:
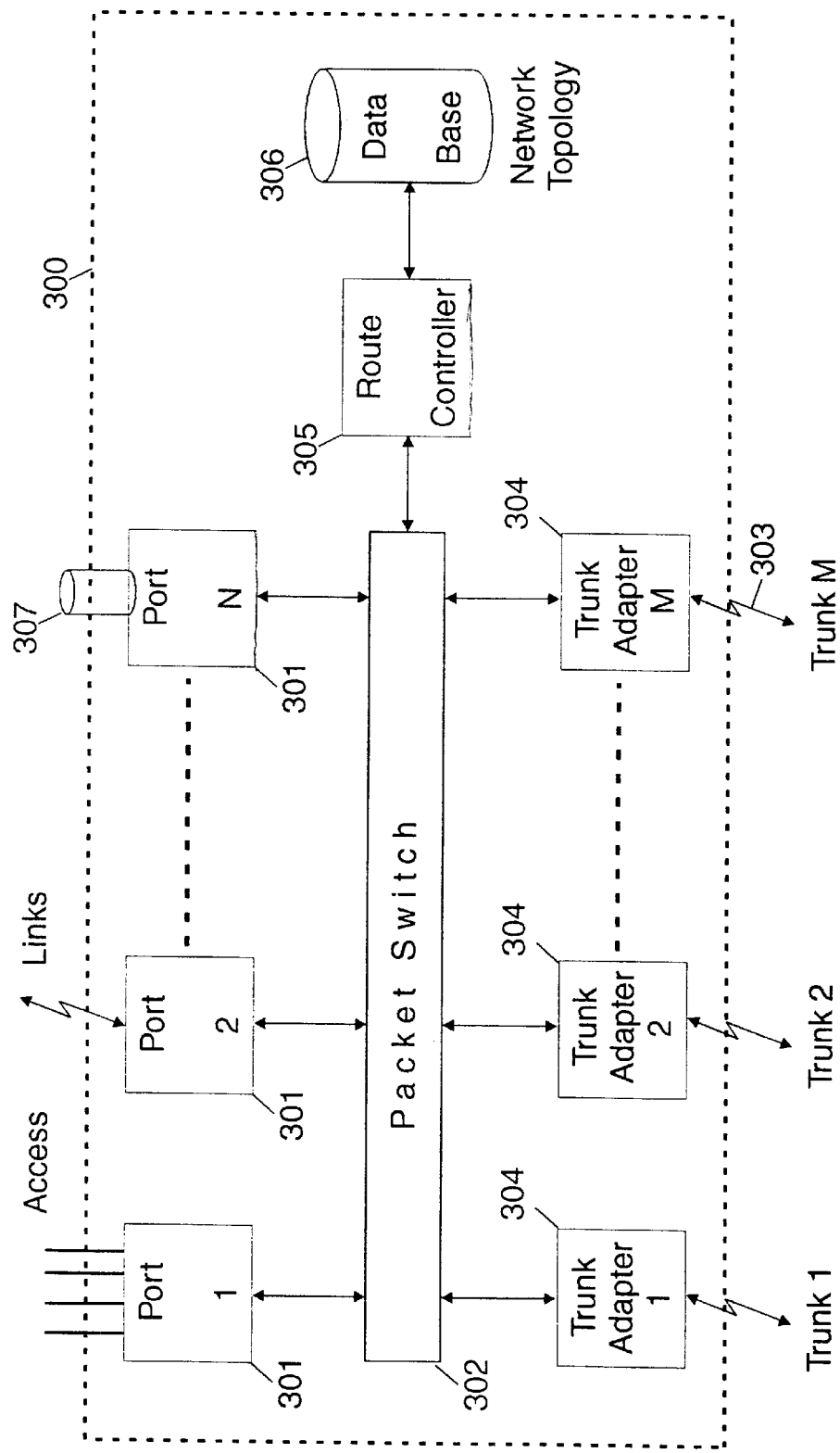
FIG. 3 describes a high speed Routing Point according to the present invention.
Figure 4:
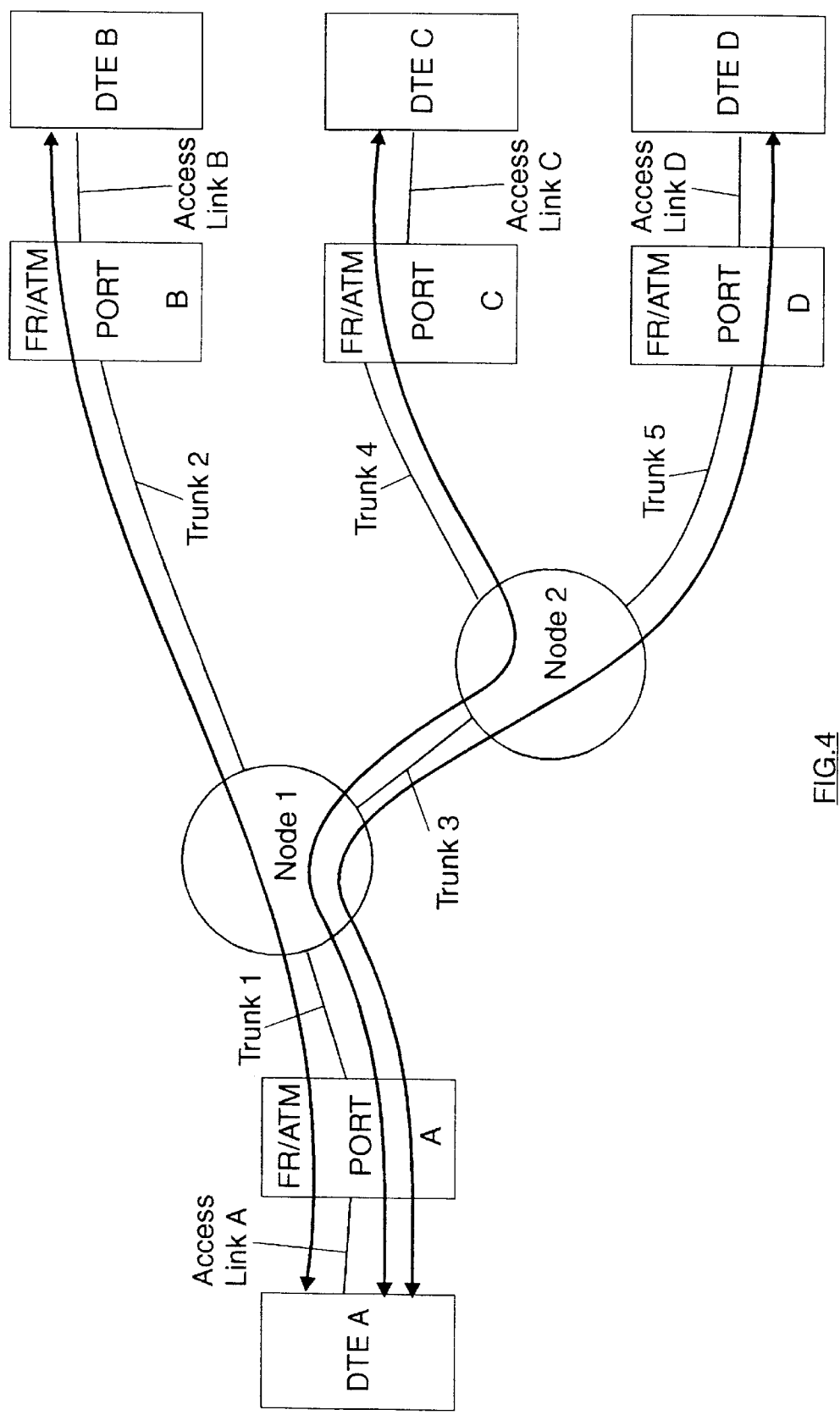
FIG. 4 shows a typical Frame Relay/ATM network.

FIG. 3 shows a general block diagram of a typical Routing Point (300) such as it can be found in the network nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality-of-services specified by the user and to minimize the amount of network resources used to complete the communication path. Then, it builds the header of the packets generated in the Routing Point. The optimization criterion includes the number of intermediates nodes, the characteristics of the connection request, the capabilities and the utilisation of the links (Trunks) in the path, the number of intermediate nodes . . . The optimum route is stored in a Routing Database (308) for further reuse.

All the information necessary for the routing, about the nodes and transmission links connected to the nodes, are contained in a Network Topology Database (306). Under steady state condition, every Routing Point has the same view of the network. The network topology information is updated when new links are activated, new nodes added to the network, when links or nodes are dropped or when link loads change significantly. Such information is exchanged by means of control messages with all other Route Controllers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point is dictated by the information in the packet header. The fast packet switching network operates to enable a communication between any two end user applications without dedicating any transmission or node facilities to that communication path except for the duration of a single packet. In this way, the utilisation of the communication facilities of the packet network is optimized to carry significantly more traffic than would be possible with dedicated transmission links for each communication path.

NETWORK MANAGEMENT NETWORK CONTROL FUNCTIONS

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular:

Directory Services for retrieving and maintaining information about network users and resources.

Bandwidth Management for processing the bandwidth reservation and maintenance messages, and for monitoring the current reservation levels on links.

Path Selection for choosing the best path for each new connection considering the connection requirements and the current link utilisation levels.

Control Spanning Tree for establishing and maintaining a routing tree among the network nodes, for using it to distribute control information (in parallel) including link utilisation, and for updating the Topology Database of the nodes with new network configurations or link/node failures.

Topology Update for distributing and maintaining, using the Spanning Tree, information about the logical and physical network (including link utilization information) in every node.

Congestion Control for enforcing the bandwidth reservation agreements between the network's users and the network which are established at the call set up time, and for estimating actual bandwidth and for adjusting reservation if necessary during the life of the connection.

TOPOLOGY DATABASE (TDB)

The Topology Database contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilisation which includes dynamic characteristics like current bandwidth (used and reserved), real-time measurements . . .

Figure 5:
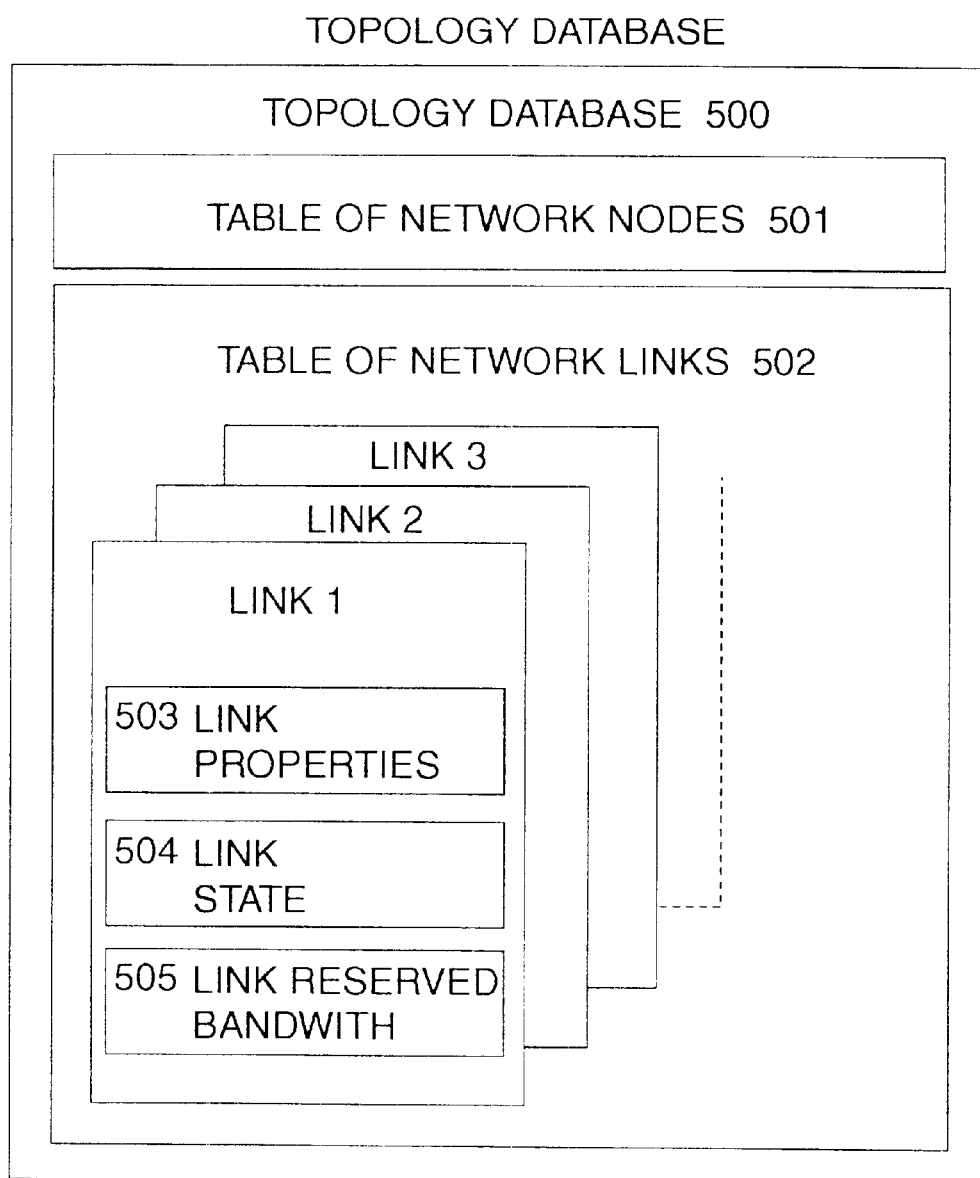
FIG. 5 describes the Topology Database structure.

The general organisation of the Topology Database is shown in FIG. 5. To each resource in the network, nodes (501) or links (502), is associated an entry in the database. In particular, each link entry includes the following characteristics:

(503) The Link Physical Properties transmission medium and speed, routing mode supported, maximum packet size, link buffer capacity, propagation delay, bandwidth reservation supported . . .

(504) The Link State on-line (link can accept user connections), quiesce (link cannot accept additional user connections, but existing connections continue), off-line (link cannot accept user connections and existing connections are cancel led) . . .

(505) The Link Utilization:

real-time measurements, reserved bandwidth, . . .

FIG. 6 shows in a table, some of the information stored in the Topology Database. Though all characteristics of the links are listed in each node, in the present application only a few will be described:

Total Capacity (bps) C

The Topology Database contains, for each link, its Total Capacity. The value $C_k$ represents the total bandwidth available on the link k between two nodes.

Reservable Fraction (%) rf

As might be expected, one of the critical characteristics of transmission links is the fraction of the link capacity effectively available. Links cannot be loaded up to a theoretical maximum load (bandwidth) for two reasons:

first, to set aside bandwidth for network control functions, and secondly, to keep the loss probabilities and queueing delays low in the case of short term bandwidth violations by the different traffic sources.

The reservable fraction of a link rf is the effective percentage of the Total Capacity $C_k$ that can be reserved on the link k, to maintain a reasonable quality of transmission. If $C_k$ is the Total Capacity of the link k, then $R_k = rf \times C_k$ is the Reservable Capacity of this link ($\hat{C}_k \leq R_k \leq C_k$).

Note: For most network architectures, no more than 85% of the total bandwidth of a link $C_k$ can be explicitly reserved for user traffic (rf<0.85).

Total Reserved Equivalent Capacity (bps) $\hat{C}_{R,k}$

For a connection i on a link k, the simplest way to provide low/no packet loss would be to reserve the entire bandwidth requested by the user. However, for bursty user traffic, this approach can waste a significant amount of bandwidth across the network. To save resources, the bandwidth amount actually reserved is equal to an "Equivalent Capacity" $\hat{C}_{k,j}$, said Equivalent Capacity being a function of the source characteristics and of the network status. The bandwidth reservation falls somewhere between the average bandwidth required by the user and the maximum capacity of the connection.

The value $$\hat{C}_{R,k} = \sum_{i=1}^{N} \hat{c}_{k,i} = sum$$

of the reserved Equivalent Capacities represents the total bandwidth reserved on the link k by N connections already established. If the difference between this already reserved link Equivalent Capacity $\hat{C}_{R,k}$ and the Total Reservable Capacity of the link $rf \times C_k$ is less than the bandwidth requested by a new reserved connection then the link cannot be selected. However, the link may be selected for a non-reserved connection where no explicit bandwidth reservation is needed.

Total Bandwidth used by Non-Reserved Traffic (bps) $M_{NR,k}$

The value $M_{NR,k}$ represents the total load or bandwidth currently used by non-reserved traffic as measured on the link k.

Total Capacity Used (bps) $\hat{C}_{T,k}$

The Total Bandwidth Used $\hat{C}_{T,k}$ on the link k is computed by adding the total reserved bandwidth $\hat{C}_{R,k}$ and the measured bandwidth $M_{NR,k}$ used by non-reserved traffic.

Maximum Packet Size (bytes) $mps_k$ $mps_k$ is defined as the maximum packet size supported by the link k.

BANDWIDTH MANAGEMENT

Users are requiring different quality-of-services. In order to provide the various service levels, different types of network connections are established. A connection is defined as a path in the network between the origin access node and the destination access node representing respectively the source user and the target user. Networks connections can be classified as reserved or non-reserved. Reserved network connections require bandwidth to be allocated in advance along the chosen path.

Most of the high speed connections are established on a reserved path to guarantee the quality of service and the bandwidth requested by the user. This path across the network is computed by the origin node using information in its Topology Database including current link utilization. The origin node then sends a reservation request along the chosen path, and intermediate nodes (if allowing the reservation) then add this additionally reserved capacity to their total. These changes are reflected in topology broadcast updates sent by the intermediate nodes. Intermediate nodes need not to have an awareness of the status of each connection on their adjacent links. If an intermediate node does get too many packets, generally because of unanticipated burstiness, it simply discards them (the user can select a service that will recover from such discards).

Depending on the node type, the function of the Bandwidth Management is:

in the origin node,
to identify the best possible route according to the network status and the connection parameters including the connection priority,
to reserve at connection setup, the bandwidth required by the network connections and to maintain this bandwidth for the duration of the connection.
to reject the connection if resources needed to satisfy the request are not available in the network.

in a transit node,
to administer the bandwidth reservations on the links, and
according to the present invention to administer the bandwidth reservations on the links of the alternate paths.

BANDWIDTH RESERVATION

Figure 1:
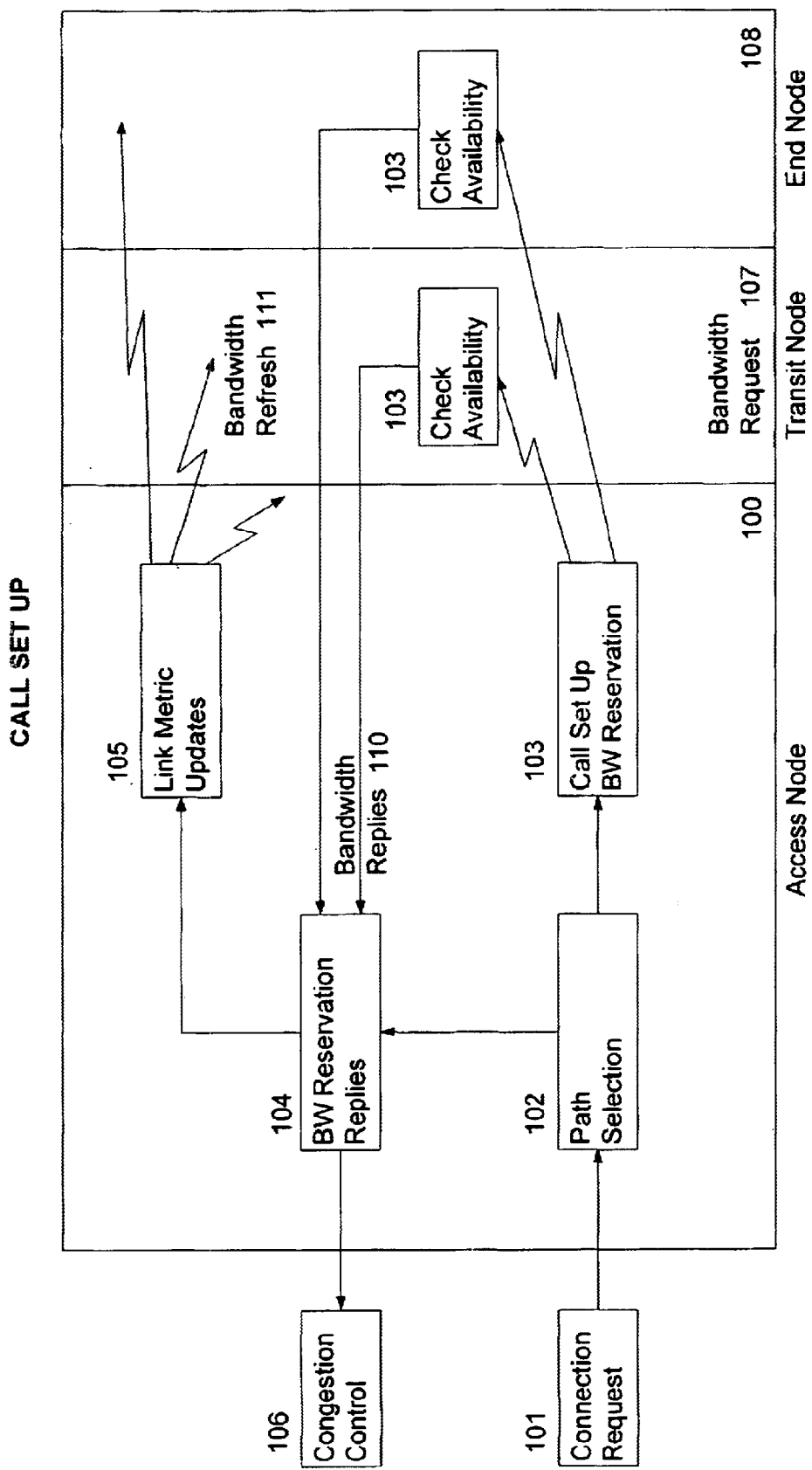
FIG. 1 describes the bandwidth reservation process.

The connection set up and bandwidth reservation process, as shown in FIG. 1, comprises the following steps:

(101) a Connection Request is specified by the user via a set of parameters including origin and destination network address, and data flow characteristics (bit rate, burstiness).

(102) a Path Selection process determines a path and a set of connection requests, one for each link of the path, using parameters provided by the Topology Database.

(103) a Bandwidth Reservation process uses the connection requests to reserve bandwidth on each of the links of the path. This process involves exchange of information (109) between the origin (access) node (100), the transit nodes (107) on the path, and the destination node (108).

(104) Bandwidth Reservation replies from transit nodes and end node generate either a call acceptance or a call reject (110).

(105) a Link Metric Update process updates, in case of call acceptance, the modified link metrics. This information (111) is sent through the Control Spanning Tree to the Topology Database of each node in the network by means of a broadcast algorithm.

(106) a Congestion Control Set Up adjusts, if the call is accepted, the network connection characteristics.

The bandwidth reservation process is performed in the origin and destination nodes by Connection Agents (CA)

and by Transit Connection Managers (TCMs) in the transit nodes along the chosen path.

PATH SELECTION

Figure 12:
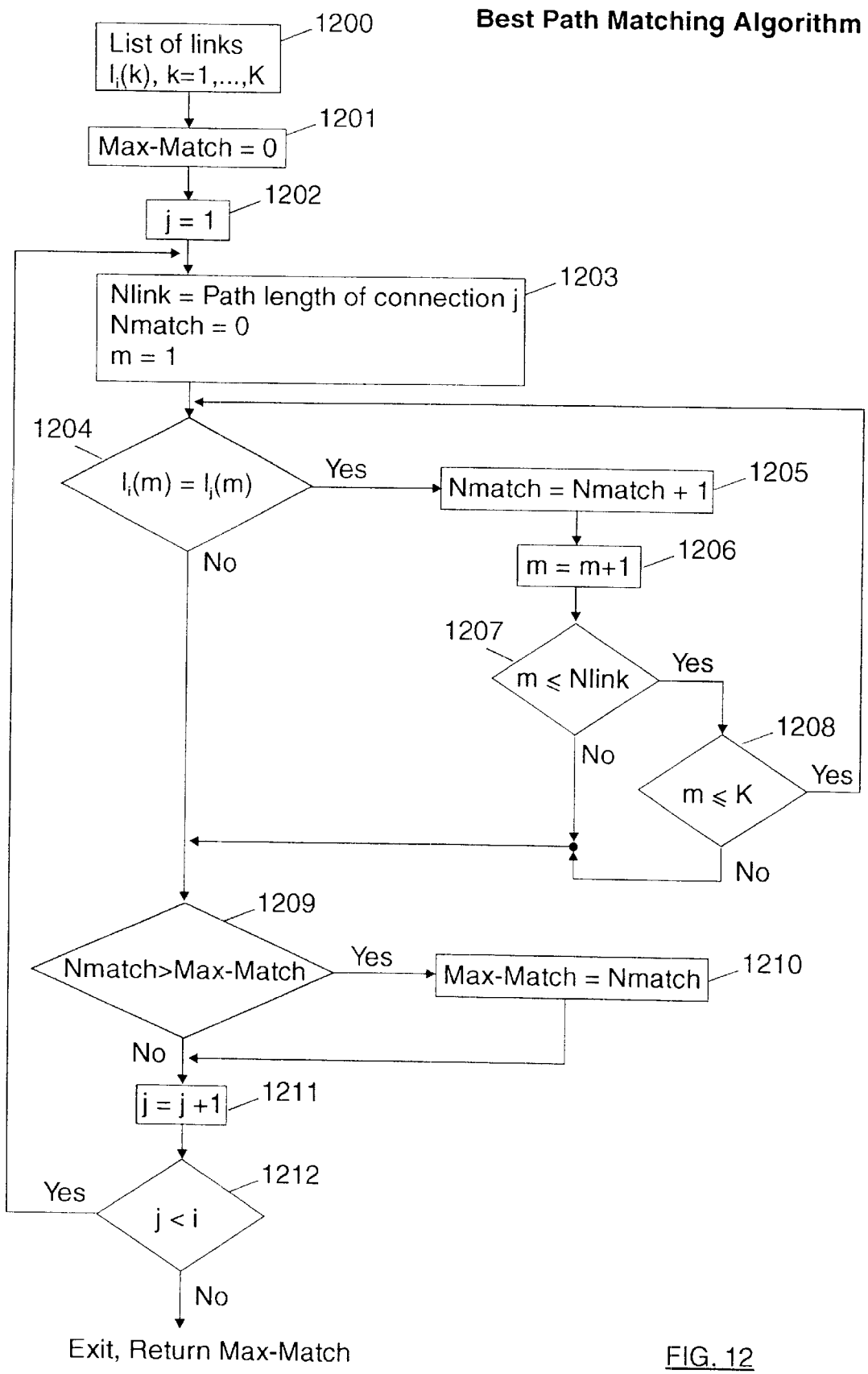
FIG. 12 is a flow chart of the Path Matching algorithm according to the present invention.

The purpose of the Path Selection process is to determine the best way to allocate network resources to connections both to guarantee that user quality of service requirements are satisfied and also to optimize the overall throughput of the network. The Path Selection process must supply to the requesting user a path over the network over which a point-to-point connection will be established, and some bandwidth will be reserved if needed. As shown in FIG. 12, the Path Selection algorithm uses as input parameters in one hand the user requirements and on the other hand the status of the network links and nodes as maintained in the Topology Database.

The Path Selection process takes place entirely within the node wherein the connection is requested. It makes use of the Topology Database and selects the "best path" based on each of the following criteria in order of importance:

Quality-of-Service:

The connection's quality-of-service requirements are to be satisfied throughout the life of the connection. There are a large number of variables that determine the performance of a network. However, the quality-of-service can be defined as the set of measurable quantities that describe the user's perception of the service offered by the network. Some of the quality-of service parameters are listed below:

connection set up delay, connection blocking probability, loss probability, error probability, end-to-end transit delay, end-to-end delay variation,

. . .

Some of these quantities have an effect upon how paths are computed, for example the packet loss probability or the end-to-end transit delay: the sum of propagation delays along a computed path may not violate the end-to-end transit delay specifications.

Minimum Hop

The path shall consist of as few links as feasible to support the connection's quality of service requirements, thus minimizing the amount of network resources as well as processing costs to support the connection. The path computation is based on the links utilization at the time the connection is requested.

Load Balancing

Among a minimum hop path, a path with "lightly loaded" links is preferred over a path with "more heavily loaded" links based on the network conditions at the time of path selection. The load of a link depend of the customer criteria: it can be an increasing function of the total reserved bandwidth of the link, proportional to the amount of traffic actually measured on the link, . . . When the path load (sum of the load of the links over the selected path) is the preponderant criterion of selection, the path of lesser load is chosen.

Satisfying the first requirement is the key factor in path selection and the other two functions are used to optimize traffic through the network.

BANDWIDTH MANAGEMENT ACCORDING TO PRIOR ART

Figure 7:
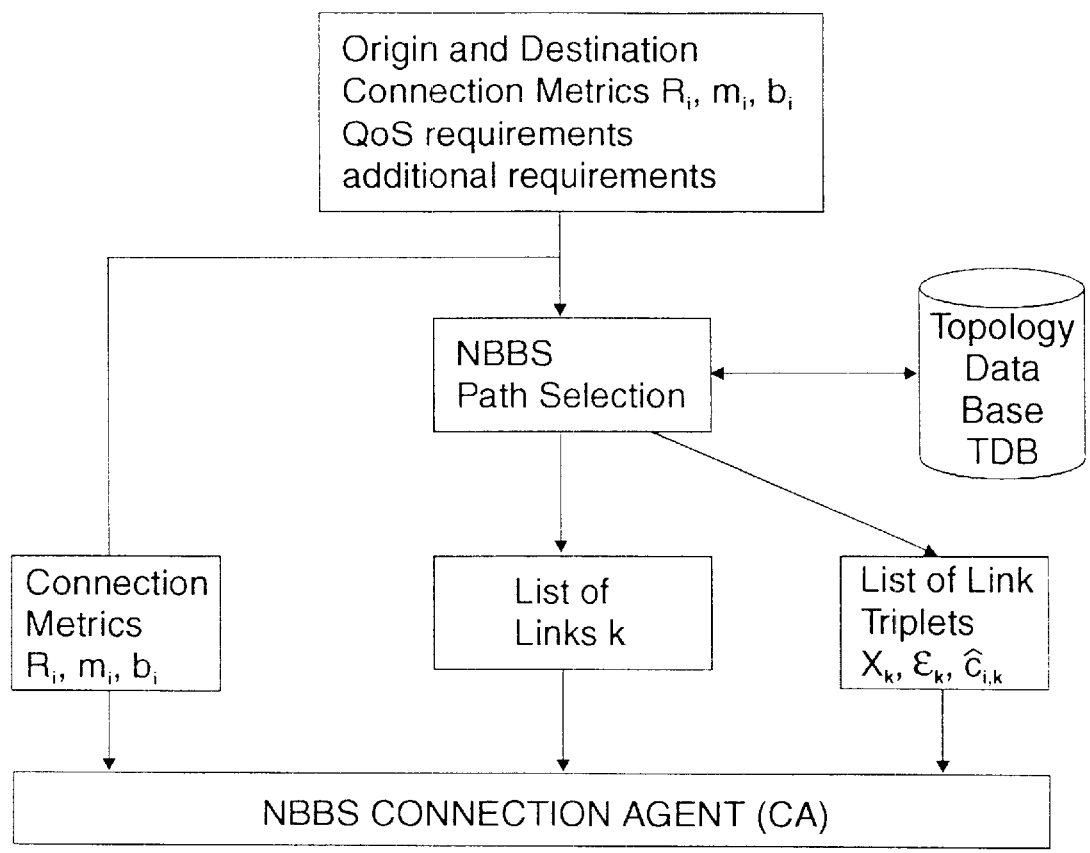
FIG. 7 shows the Path Selection and the connection set-up process according to prior art.

The bandwidth management of the NBBS (Networking BroadBand Services) architecture illustrated in FIG. 7 is described in the present specification as example of prior art. For simplicity, a single class of service is considered. However, it should be clear that the extension to multi-priorities is straightforward and is covered by NBBS (for more details about NBBS, refer to IBM's publication entitled "Networking Broadband Services (NBBS) Architecture Tutorial"—IBM ITSC June 1995 GG24-4486-00).

CONNECTION METRICS

Metrics are used to represent network connections with different characteristics. They are obtained from a model that captures the basic behavior of the data source associated with a connection. The behavior of any source can be modeled with a two state model: a source is either idle, generation no data, or active, transmitting data at its peak rate. The bit rate of a connection can therefore be represented by two states, namely: an idle state (transmitting at zero bit rate) and a burst state (transmitting at peak rate). A burst is defined to be a sequence of packets transmitted by the source into the network at its peak rate. The:

peak rate of a connection, distribution of the idle period, and distribution of burst length, completely identify the traffic statistics of a connection, assuming the duration of burst and idle periods are exponentially distributed and are not correlated. In this two-state model, a connection i is defined by its metric $c_i = (R_i, m_i, b_i)$, where $R_i$ (in bits per seconds) is the access bit rate (peak bandwidth), $m_i$ (in bits per seconds) is the average bit rate, and $b_i$ (in seconds) is the average burstiness (mean burst duration).

These three parameters are used to specify the bandwidth requirements for the network connection so that the appropriate path can be selected and sufficient bandwidth reserved. Additionally, these parameters are used by the Congestion Control function to monitor conformance of the network connection to its bandwidth reservation.

The variance of the bit rate is $\sigma_i^2 = m_i(R_i - m_i)$.

The quantities $m_i$ and $\sigma_i^2$ provide indications of the mean bandwidth requirement, in bits per second, of a network connection and the magnitude of fluctuations around this mean value. The quantity b gives an indication of the duration of transmission bursts generated by the source. For the same utilization, a large b indicates that the source alternates between long burst and idle periods. A small b indicates that data is generated in short alternating burst and idle periods. Two sources with identical mean and peak bit rates but different burst periods, have different impacts on the network. For example, a long burst will have a major impact on queueing points in the network.

EQUIVALENT CAPACITY

The Equivalent Capacity of a network connection $c_i = (R_i, m_i, b_i)$ is defined as the minimum bandwidth needed on a link to support the connection assuming that no other connections are using the link.

$$\hat{c}_i = f(R_i, m_i, b_i, X, \varepsilon) = R_i \frac{y_i - X + \sqrt{[y_i - X]^2 + 4X\rho_i y_i}}{2y_i} \quad (1)$$

where:

X is the size of the buffer where packets are queued while waiting transmission on the trunk line. Large buffer sizes enable bursts of traffic to be handled without packet loss. However, large buffer sizes also enable a larger queueing delay; therefore, the buffer size is usually related to the delay priority associated with a network connection.

ε is the proportion of packets that can be lost due to the buffer overflowing. This proportion or packet loss ratio objective is dependent on the quality-of-service required by the network connection, and will generally be very small indeed (less than $10^{-6}$).

$y_i = \ln(1/\epsilon) b_i (1-p_i) R_i$, and $p_i = m_i / R_i$.

In case of a continuous bit stream connection, $p_i=1$ ($m_i = R_i$), $b_i = \infty$ and $\hat{c}_i = R_i$.

LINK BANDWIDTH MANAGEMENT

A Link Metric vector is a triplet representing the aggregation of all the connections i traversing a link k (in NBBS, several link metrics are defined, corresponding to the different delay priorities, but as mentioned, the simplified assumption of a single class of service per trunk is used). Link Metrics vectors are distributed to other nodes via Topology Database (TDB) update messages. The Equivalent Capacity $\hat{C}_k$ associated with the aggregation of $N_k$ connections established on the link k, combines two characteristics of the traffic of the network:

The bandwidth needed by a single network connection considered separately, a function of its characteristics, system resources and desired quality-of-service.

The impact of statistical multiplexing when many network connections, possibly with different characteristics, are aggregated.

$$L_k = \left\{ M_k = \sum_{i=1}^{N_k} m_i, S_k^2 = \sum_{i=1}^{N_k} \sigma_i^2, \hat{C}_k^{(N_k)} = \sum_{i=1}^{N_k} \hat{c}_i \right\} \quad (2)$$

$$L_k = \left\{ \sum_{i=1}^{N_k} m_i, \sum_{i=1}^{N_k} m_i(R_i - m_i), \sum_{i=1}^{N_k} \hat{c}_i \right\}$$

where the index i runs over the $N_k$ connections already transported on the trunk.

Relation (2) can be written:

$$L_k = \{M_k, S_k^2, \hat{C}_k^{(N_k)}\} \quad (3)$$

where:

$$M_k = \sum_{i=1}^{N_k} m_i:$$

sum of the mean of bit rates=mean of the aggregate bit rate, $$S_k^2 = \sum_{i=1}^{N_k} m_i(R_i - m_i):$$

sum of the variances of the bit rates=variance of the aggregate bit rate, $$\hat{C}_k^{(N_k)} = \sum_{i=1}^{N_k} \hat{c}_i$$

sum of the individual Equivalent Capacities of all the $N_k$ connections established on the link k.

The current level of reservation of the link k is given by:

$$\hat{C}_k^1 = \min\left\{ \sum_{i=1}^{N_k} (m_i + \alpha \sigma_i), \sum_{i=1}^{N_k} \hat{c}_i \right\} = \min\{(M_k + \alpha S_k), \hat{C}_k^{(N_k)}\} \quad (4)$$

with:

$\alpha \approx \sqrt{2\ln 1/\epsilon - \ln 2\pi}$,

Equation (4) provides a reasonably accurate estimate of the capacity required to support a given set of network connections.

The first function ($M_k + \alpha S_k$) relies on a Gaussian approximation to characterize the aggregate bit rates of all connections routed over a link k. This model capture the stationary behaviour of aggregate bit rate and provides a good estimate for cases where many connections have long bursts periods and relatively low utilization. In such cases, individual network connections often require close to their peak, while the stationary behavior of their aggregation indicates that much less is in fact needed. The Gaussian assumption, however implies that the model may be inaccurate when used with a small number of high peak rate network connections.

The second function (sum of the individual equivalent capacities obtained for equation (1)) captures the impact of source characteristics, in particular the duration of the burst period, on the required bandwidth. This result is substantial capacity savings when the duration of the burst period is small.

From equation (4), it is seen that the equivalent capacity can be easily updated as new connections are added or removed, provided that the total mean and variance of the bit rate and the sum of all individual equivalent capacities are kept.

PATH SELECTION

Bandwidth request messages for routing new connections ($R_i$, $m_i$, $b_i$) and updating the Link Metric vectors, contain a request vector defined by:

$r_i = (m_i, \sigma_i^2, \hat{c}_i)$

Note: The access bit rate (peak bandwidth) $R_i$ is derived from this request vector $r_i$ by means of the expression:

$R_i = m_i + \sigma_i^2 / m_i$

A Path Selection algorithm—a variant of the Bellman-Ford algorithm in a preferred embodiment—is then executed. The algorithm screens the network links which are defined in the Topology Database (TDB). For each link examined as a candidate for being part of the path, the Path Selection:

1. Computes the Equivalent Capacity $\hat{c}_i$ of the connection i over this link using relation (1).

2. Determines Whether the Connection is Multiplexable or not

The Part Selection computes $t_1 = C_k^0 - N \times m_i$ and $t_2 = \alpha^2 N \times \sigma_i^2$, where:

$C_k^0$ represents the link reservable bandwidth, and $N'$ is a constant specifying the minimum number of connections needed by the Gaussian assumption.

3. Estimates the Link Metric $L'_k$ if the New Connection is to be Added

Two cases must be distinguished, depending on the potential impact of the network connection on the link; the need for these two cases arises from the form of the equation (4).

More specifically, the assumption that the aggregate bit rate has a Gaussian distribution is valid only if a sufficient number of connections can be multiplexed on the link. For any given type of connection, this depends on both the connection characteristics and the total link bandwidth.

If $t_1 > 0$ and $t_2 < t_1^2$, then the connection is multiplexable, and the Gaussian approximation is used:

$$L'_k = L_k + r_i L_k + (m_i, \sigma_i^2, \hat{c}_i) = \{M'_k, S'^2_k, \hat{C}'^{(N_k+1)}_k\} \quad (5)$$

where addition is component-wise.

Else, the connection is not multiplexable, and the Equivalent Capacity must be reserved on the link:

$$L'_k = L_k + \tilde{r}_i L_k + (\hat{c}_i, 0, \hat{c}_i) = \{M'_k, S'^2_k, \hat{C}'^{(N_k+1)}_k\} \quad (6)$$

Equation (6) simply states that network connections for which the Gaussian assumption does not hold are treated as constant bit rate connections ($\sigma_i^2 = 0$) with rate equal to their equivalent capacity as given by equation (1). From the updated Link Metric vector, the new allocated equivalent bandwidth is easily computed using again equation (4).

4. Checks the Link Eligibility

The ability of the link to handle the new connection is then checked. The bandwidth which would be reserved on the link after the new connection has been accepted on this link is equal to:

$$\hat{C}_k^2 = \min\{(M'_k + \alpha . S'_k), \hat{C}'^{(N_k+1)}_k\} \quad (7)$$

where the $(M'_k, S'^2_k, \hat{C}'^{(N_k+1)}_k)$ values denote the components of the Link Metrics as updated by relations (5) or (6). The link is able to handle the new connection if $$\hat{C}_k^2 \leq C_k^0 \quad (8)$$

5. Computes the Load Balancing Weight of the Link

If the link k is eligible, the link ability to support the new connection is estimated by the load balancing weight of the link:

$$w_k = \frac{C_k^0}{(C_k^0 - \hat{C}_k^1)(C_k^0 - \hat{C}_k^2)} \quad (9)$$

where:

$\hat{C}_k^1$ is computed from relation (4) and represents the bandwidth currently reserved on the link k not taking the requesting connection into account.

$\hat{C}_k^2$ represents the bandwidth that will be reserved on the link k if the link is chosen to carry the requesting connection.

$C_k^0$ is the total capacity of the link k.

This Link Weight $w_k$ is then used in the Path Selection algorithm to properly insure load balancing in the network.

CONNECTION ESTABLISHMENT

Once a path has been selected in the network, the Connection Agent (CA) in origin node prepares a connection set-up message and sends it over the path, with a copy to every Transit Connection Manager (TCM) in transit nodes and to the destination Connection Agent (CA). Among other information, the connection set-up message includes:

the parameters $(m_i, \sigma_i^2, b_i)$ of the new connection i (the Connection Metric $c_i = (R_i, m_i, b_i)$ can be derived from $(m_i, \sigma_i^2, b_i)$), and the triplets $(X_k, \epsilon_k, \hat{c}_{i,k})$ for each link k of the path.

TRANSIT CONNECTION MANAGER (TCM)

Upon receiving the connection set-up message, the Transit Connection Manager (TCM) of link k executes several verifications, including bandwidth management. The TCM:

1. Extracts from the received triplets $(X_k, \epsilon_k, \hat{c}_{i,k})$ the Equivalent Capacity $\hat{c}_{i,k}$ of the connection. To do so, the Transit Connection Manager (TCM) correlates the $(X_k, \epsilon_k, \hat{c}_{i,k})$ values of the triplets with its own $(X_k, \epsilon_k)$ values.

2. Determines whether the connection is multiplexable or not, according to step 2 described above in the Path Selection section.

3. Estimates the Link Metric $L_k$ if the new connection is to be added using relations (5) and (6).

4. Determines the link eligibility using relations (7) and (8).

5. If the link is eligible, grants the bandwidth to the origin Connection Agent (CA), and updates the Link Metrics LA according to relations (5) and (6). The TCM eventually broadcasts the new values.

BANDWIDTH MANAGEMENT ACCORDING TO U.S. APPLICATION SER. NO. 97131

Figure 8:
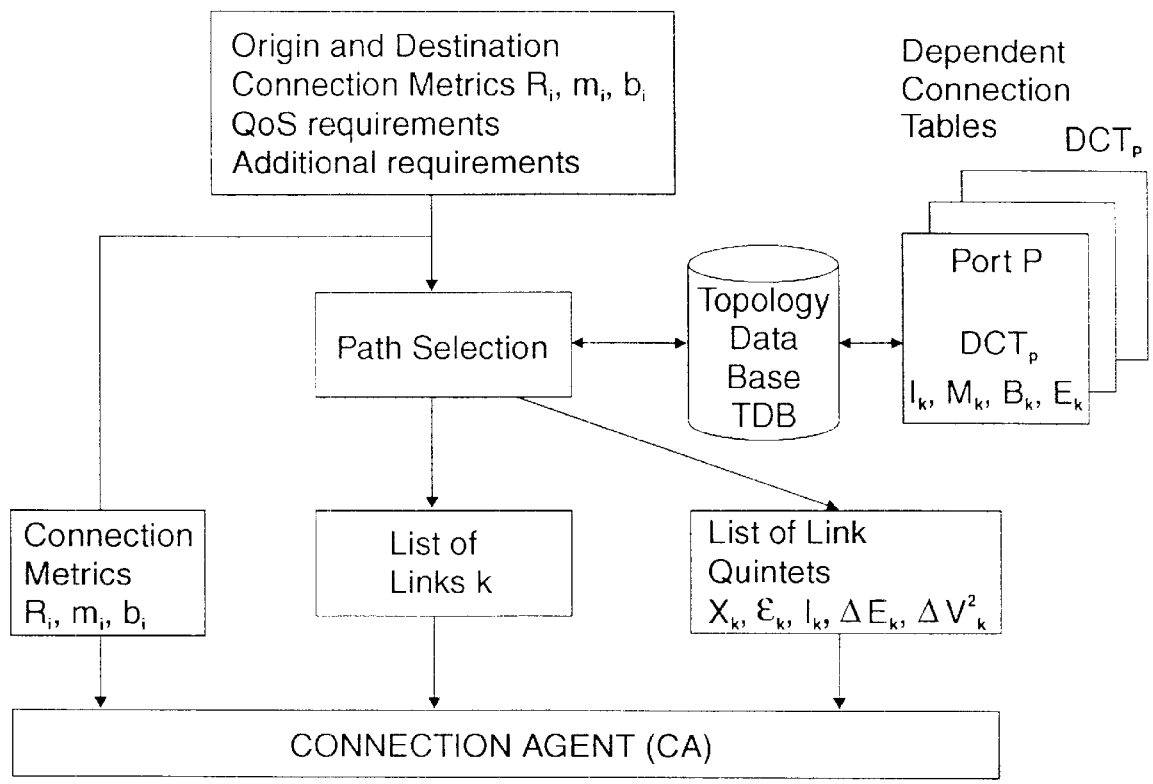
FIG. 8 shows the Path Selection and the connection set-up process according to U.S. patent application Ser. No. 97131 (IBM's reference FR 9 95 035).

Non published U.S. patent application Ser. No. 97131 (IBM's reference FR 9 95 035) discloses a method and system for establishing new connections in the network while taking into account the dependance of these connections with other connections originated from the same port. The so called Dependent Connection Bandwidth Management process shown in FIG. 8 is based on:

1. an accounting per port of all connections established on every link in the network.

2. a modification of the path selection algorithm in the access node, 3. an insertion of additional fields in the connection set-up message, and 4. a modification of the Transit Connection Manager (TCM) algorithms in transit nodes.

PER PORT LINK ACCOUNTING

In the Route Controller of each node, a set of tables is defined, one for each port of the node. In particular for each port p a Dependent Connection Table $DCT_p$ is maintained. This table comprises an entry for each link in the network and each entry includes the information required to manage the bandwidth of the link and the dependency of the port connections. The entry k of table $DCT_p$ corresponds to link k, and includes a quadruplet:

$$DCT_p(k) = \{l_k, M_k, B_k, E_{k,}^{(N_k)}\}$$

$DCT_p$ is called "Dependent Connection Table attached to port p".

$l_k$ is a bolean.

If $l_k = 1$, then a "Dependent Connection Bandwidth Management" (DCBM) according to the present invention can be used on link k.

Else, the bandwidth management according to prior art (NBBS) is used.

$M_k$ represents the mean bit rate of the aggregation of the $N_k$ connections i issued from port p and using link k.

$B_k$ represents the mean burst duration of the aggregation of the $N_k$ connections i issued from port p and using link k.

$E_k^{(N_k)}$ represents the Equivalent Capacity required on link k by the aggregation of the $N_k$ connections issued from port p and using link k:

$$E_k^{(N_k)} = f(R, M_k, B_k, X, \epsilon)$$

where the function f is given by relation (1).

$$E_k^{(N_k)} = R \frac{Y_k - X + \sqrt{[Y_k - X]^2 + 4X\rho_k Y_k}}{2Y_k}$$

where:
R is the port access rate,
$Y_k = \ln(1/\epsilon)B_k(1-p_k)R$, and
$p_k = M_k/R$.

PATH SELECTION

The Dependent Connection Bandwidth Management (DCBM) modifies the Path Selection process as explained hereunder. For each link k examined as a candidate for being part of the path, the computations and verification take into account the entries in the Dependent Connection Table $DCT_p(k)$, and a bolean $I_{dcbm}$ initialized to "1" at the beginning of the path search:

If $I_{dcbm}$ AND $I_k=1$ then the Dependent Connection Bandwidth Management (DCBM) is used as detailed below.

Else, the bandwidth management according to prior art (NBBS) is used.

As the result of each iteration, a link k_select is selected, and the bolean $I_{dcbm}$ is updated:

$I_{dcbm} = I_{dcbm}$ AND $I_{k\_select}$

The algorithm is executed for each link k if $I_{dcbm}$ AND $I_k=1$. The Path Selection process comprises the steps of:

1. Computing the Equivalent Capacity $E'_k{}^{(n_k-1)}$ required on link k when the additional connection i with metric ($R_i$, $m_i$, $b_i$) is added to the aggregation of the $N_k$ connections issued from port p and already established on link k.
2. Deriving the increase of the Equivalent Capacity $\Delta E_k$ required to transport the additional connection.
3. Computing the increase of the variance of the bit rate $\Delta V_k^2$ of the aggregation of the ($N_k+1$) connections issued from port p and transported on link k.
4. Determining whether the connection is multiplexable or not.
5. Estimating the Link Metric if the new connection was to be added.
6. Checking the link eligibility.
7. Computing the load balancing weight of the link.

If the link k is eligible, the link ability to support the new connection is estimated by the load balancing weight of the link.

CONNECTION ESTABLISHMENT

Among other information, the connection set-up message includes:

the connection metric of the new connection i:
($m_i$, $\sigma_i^2$, $b_i$)
a quintet for each link k of the path:
($X_k$, $\epsilon_k$, $l_k$, $\Delta E_k$, $\Delta V_k^2$)

TRANSIT CONNECTION MANAGER (TCM)

Upon receiving the connection message, the Transit Connection Manager (TCM) associated to link k first tests the Boolean $I_k$.

If $I_k=0$, the Transit Connection Manager (TCM) executes the bandwidth management algorithms according to prior art (NBBS) as previously detailed.

If $I_k=1$, the Transit Connection Manager (TCM) executes the Dependent Connection Bandwidth Management (DCBM) algorithms. In particular, the TCM:

1. Extracts from the receive quintets the increase in Equivalent Capacity $\Delta E_k$ and the increase in variance $\Delta V_k^2$ due to the new connection.
2. Determines whether the connection is multiplexable or not, according to step 2 described above in Path Selection section.
3. Estimates the Link Metric if the new connection is to be added.
4. Determines the link eligibility.
5. If the link is eligible, grants the bandwidth to the origin Connection Agent (CA), and updates the Link Metrics.

IMPLEMENTATION

Path Selection.

The Path Selection must support the steps 1, to 7, described above in the Path Selection section and a Dependent Connection Table ($DCT_p$) must be defined for each port p attached to the node.

Connection Agent (CA)

The modification at the Connection Agent (CA) level includes in particular a change in the format of the connection set-up message with the definition of additional fields.

Transit Connection Manager (TCM)

The adaptation of the Transit Connection Manager (TCM) in transit nodes includes the handling of a new type of set-up message with additional fields and the support of steps 1, to 5, described above in the TCM section.

BANDWIDTH MANAGEMENT ACCORDING TO THE PRESENT INVENTION

The present application discloses an improved method and system for saving bandwidth taking advantage of the property of dependent connections while limiting the resources required for establishing connections in both access and transit nodes. More particularly, the object of the present application is to manage dependent connections in access nodes only without impacting transit nodes, and, to process the invention independently of the Path Selection algorithm and of the connection set-up.

Figure 9:
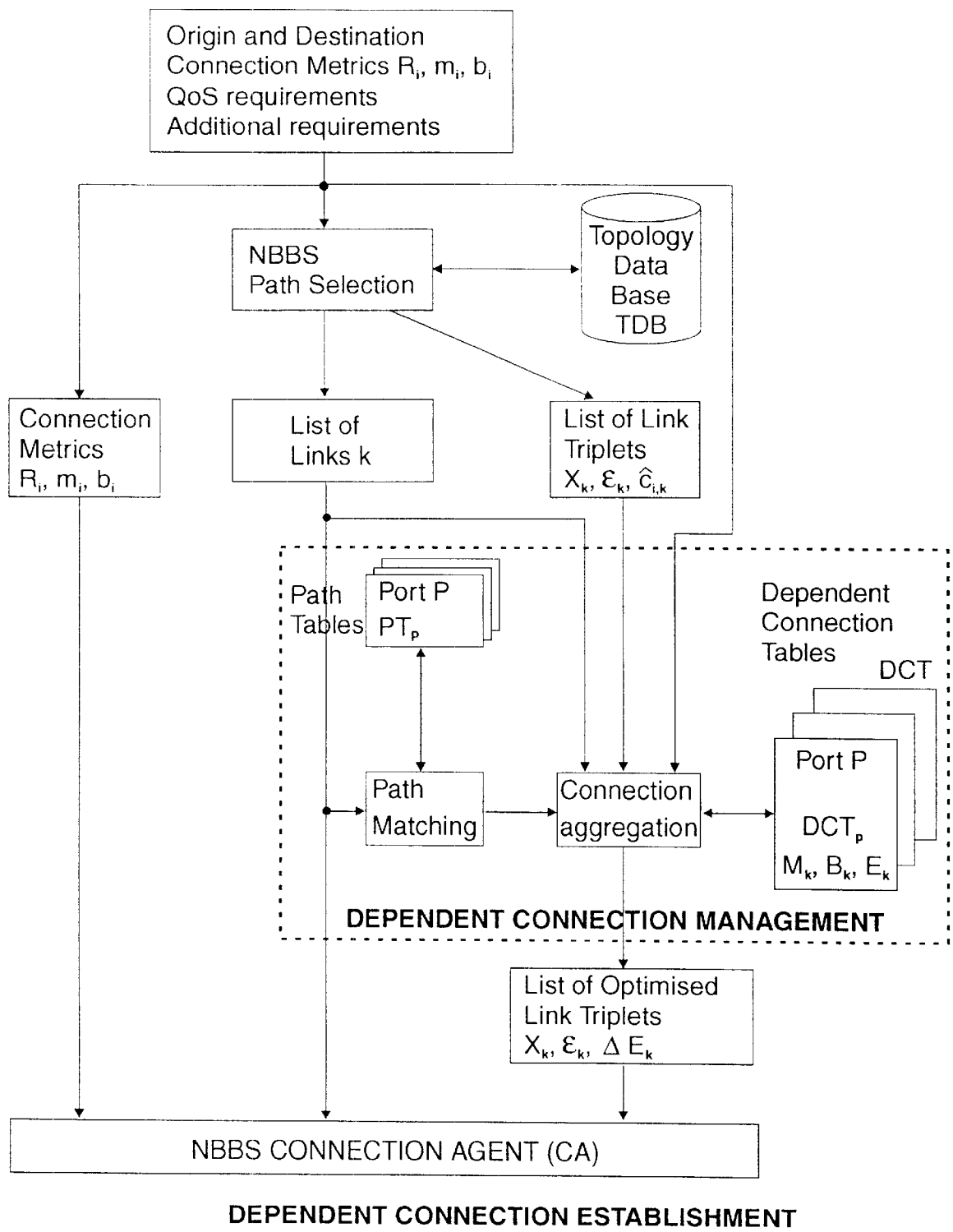
FIG. 9 shows the Path Selection and the connection set-up process for dependent connections according to the present invention.

In the following description, only a single class of service is considered. It should be clear that the extension to multi-priorities is straightforward. As illustrated in FIG. 9, the present invention is based on 1. an accounting of the connections established on each of the links and issued from a same port,
2. an accounting of the paths selected for connections issued from a same port,
3. a path matching algorithm for comparing the path of connections issued from a same port,
4. an algorithm for aggregating on each link the bandwidth of connections issued from a same port.

CONNECTION ACCOUNTING

In the Route Controller of each node, a set of tables is defined, one for each port of the node. In particular for each port p a Dependent Connection Table $DCT_p$ is maintained. This table comprises an entry for each link in the network and each entry includes the information required to manage the bandwidth of the link and the dependency of the port connections. The entry k of table $DCT_p$ corresponds to link k, and includes a triplet:

$$DCT_p(k) = \{M_k, B_k, E_k{}^{(N_k)}\} \qquad (10)$$

$DCT_p$ is called "Dependent Connection Table attached to port p".

$M_k$ represents the mean bit rate of the aggregation of the $N_k$ connections i issued from port p and using link k:

$$M_k = \sum_{i=1}^{N_k} m_i \qquad (11)$$

$B_k$ represents the mean burst duration of the aggregation of the $N_k$ connections i issued from port p and using link k:

$$B_k = \frac{\sum_{i=1}^{N_k} m_i \times b_i}{\sum_{i=1}^{N_k} m_i} \tag{12}$$

$E_k^{(N_k)}$ represents the Equivalent Capacity required on link k by the aggregation of the $N_k$ connections issued from port p and using link k:

$$E_k^{(N_k)} = f(R, M_k, B_k, X, \epsilon) \tag{13}$$

where the function f is given by relation (1).

$$E_k^{(N_k)} = R \frac{Y_k - X + \sqrt{[Y_k - X]^2 + 4X\rho_k Y_k}}{2Y_k}$$

where:
R is the port access rate,
$Y_k = \ln(1/\epsilon) B_k (1 - p_k) R$, and
$\rho_k = M_k/R$.

PATH ACCOUNTING

In the Route Controller of each node, a set of tables is defined, one for each port of the node. In particular, for each port p, a Path Table $PT_p$ is maintained. This table comprises an entry j for each connection j that originates from port p. Each entry includes the list of the links used by this connection. The entry j of Path Table $PT_p$ corresponds to connection j. Each entry j is of variable size, depending upon the path length (number of links along the path). In a preferred embodiment, the set of indexes used to address the links in the Path Table $PT_p$ is the same as this used to address the entries in the Dependent Connection Table $DCT_p$.

Figure 10:
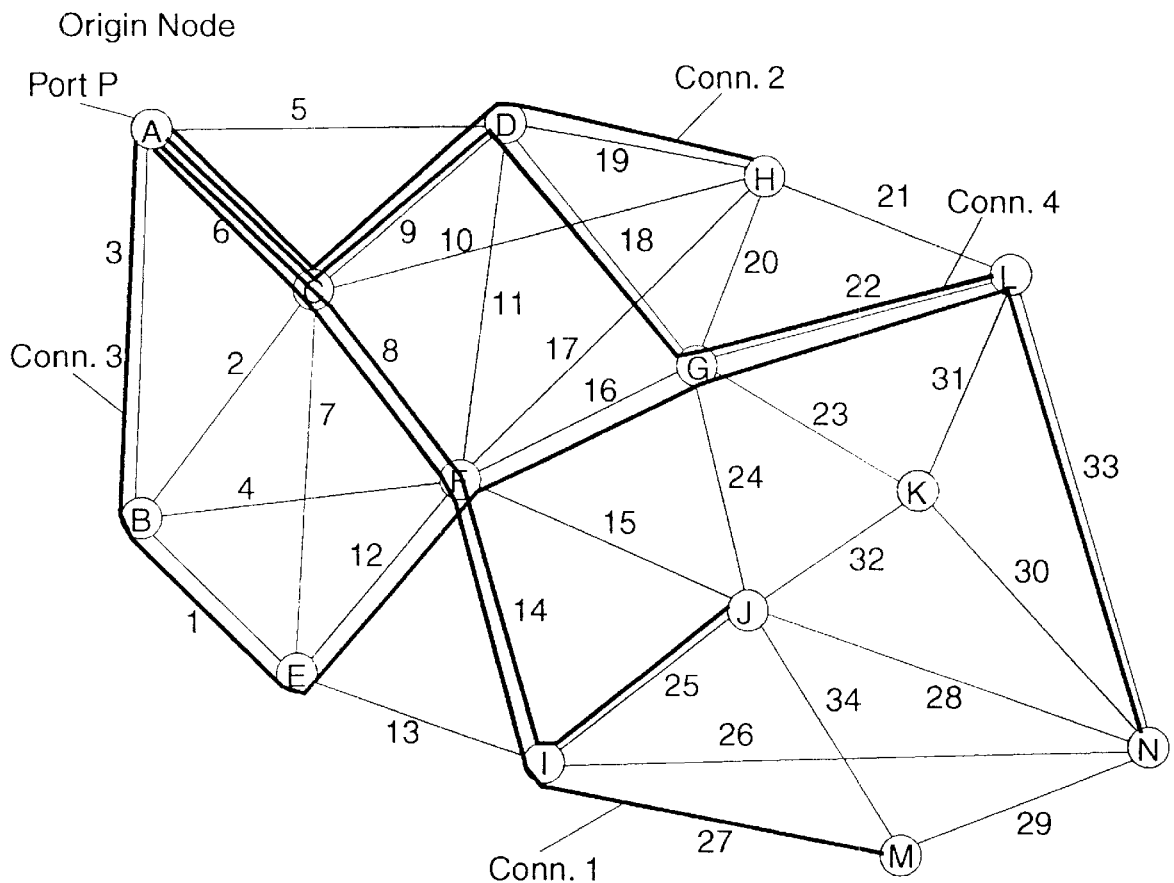
FIG. 10 is a general view of a high packet switching network showing in particular 5 dependent connections issued from the same port p at node A.

FIG. 10 is an example of high speed packet switching network where 5 dependent connections (issued from a same port p) at node A have been established:

connection 1 from node A to node M: 4 links—6, 8, 14, 27.
connection 2 from node A to node H: 3 links—6, 9, 19.
connection 3 from node A to node N: 6 links—3, 1, 12, 16, 22, 33.
connection 4 from node A to node L: 4 links—6, 9, 18, 22.
new connection 5 from node A to node J: 4 links—6, 8, 14, 25.

The corresponding Path Table $PT_p$ at access node A for port p is shown in FIG. 11. A connection index in the table identifies the dependent connections (connections 1 to 5) issued from port p. When a new connection i is established, the path of this connection is recorded as a new entry in the Path Table $PT_p$. For example, for new connection i=5 a 5th entry is added to the $PT_p$. The path length of this new connection 5 is equal to 4, that means that 4 links have been selected within the network to transmit traffic from origin node A to destination node J: links 6, 8, 14, and 25.

PATH MATCHING

FIG. 12 is a flow chart of the Path Matching algorithm. This algorithm identifies for each link k the dependent connections (connections issued from the same port p). At each new connection request, the algorithm compares in the Path Table $PT_p$ the path of the new connection i with the path previously selected for each existing connections j issued from the same port p. The algorithm identifies on the path selected for connection i all consecutive links, starting from the origin node, shared with dependent connections j. In the example shown in FIGS. 10 and 11, the Path Matching algorithm processed in view of the establiment of the new connection 5 along the routing path 6, 8, 14, 25 has identified a maximum of 3 (MAX_MATCH=3) consecutive links shared with at least another connection issued from the same port. These 3 consecutive links common with connections 1 and 5 are link 6, link 8 and link 14.

The Path Matching algorithm comprises the following steps:

(1200) The list of the links k selected for the new connection i is used in input of the Path Matching algorithm. K, the path length, represents the number of selected links. In the example illustrated in FIG. 11, i=5 and selected links=link 6, link 8, link 14, link 25, with m=1, 2, 3, 4, and K=4).

(1201) The Parameter MAX_MATCH is set to zero. MAX_MATCH will represent at the end of the algorithm the maximum number of links of a continuous path starting from the origin node (node A) and comprising links common with other connections j issued from the same port p.

(1202) The variable j (connection index) is set to one (selection of the first connection in the Path Table). This variable j identifies the connection j in the Path Table $PT_p$.

(1203) The following variables are initialized:
NLINK is set equal to the path length of connection j as it appears in the Path Table $PT_p$ (as shown in FIG. 11, the path length of connection 1 is equal to 4).
NMATCH is set to zero. NMATCH represents the number from the origin node of links consecutively shared among connection i and connection j.
m=1: the first link of connection is selected. m is a variable used to select the mth link along the routing path of connections i or j. This mth link is counted from the origin node (node A).

(1204) A test determines whether the mth link of connection i is the same as the mth link of connection j or not:
If the selected link is shared among connection i and connection j, then
(1205) the value of NMATCH is updated:
NMATCH=NMATCH+1
(1206) m=m+1: the next link along the routing path of connections j and i is selected in the Path Table $PT_p$.
(1207) A test determines whether m is lower or equal than the path length NLINK of connection j (4 in FIG. 11) or not:
If m is lower or equal than NLINK, then:
(1208) A test determines whether m is lower or equal to K or not (K is the path length of connection i, K=4 in FIG. 11):
If m is lower or equal to K then the algorithm goes on with step (1204).
If m is not lower or equal to K then all links along the routing path of connection i have been processed and the algorithm goes on with step (1209).
If m is not lower or equal than NLINK, then the algorithm goes on with step (1209).
If the selected link is not shared among connection i and connection j, the algorithm goes on with step (1209).

(1209) A test determines whether NMATCH is higher than the maximum number MAX_MATCH:
If NMATCH is higher than MAX_MATCH then:
(1210) MAX_MATCH=NMATCH If NMATCH is not higher than MAX_MATCH then the algorithm goes on with step (1211).

(1211) The next connection in the Path Table $PT_p$ is selected: j=j+1

(1212) A test determines whether j is lower than i or not:
If j is lower than i then the algorithm goes on with the next connection in the Path Table $PT_p$ in step (1203).
If j is not lower than i then the algorithm is completed. All connections in the Path Table $PT_p$ have been visited.

In the example shown in FIGS. 10 and 11, the variable MAX_MATCH is equal to 3. That means that the first 3 links counted from node A are shared among connection 1 and new connection 5.

CONNECTION AGGREGATION

The connection aggregation algorithm is executed on the links identified by the Patch Matching algorithm (links 6, 8, 14 as shown in FIG. 10). The connection aggregation algorithm comprises the steps of:

Computing the Equivalent Capacity $E'^{(N_k+1)}_k$ required on link k when the additional connection i with metric ($R_i$, $m_i$, $b_i$) is added to the aggregation of the $N_k$ connections issued from port p and already established on link k:

$$E'^{(N_k+1)}_k = f(R, M'_k, B'_k, X, \epsilon) \quad (14)$$

where:

$$M'_k = M_k + m_i$$

$$B'_k = \frac{m_i \times b_i + \sum_{j=1}^{N_k} m_j \times b_j}{m_i + \sum_{j=1}^{N_k} m_j} = \frac{m_i \times b_i + B_k M_k}{m_i + M_k}$$

Deriving the increase of the Equivalent Capacity $\Delta E_k$ required to transport the additional connection:

$$\Delta E_k = E'^{(N_k+1)}_k - E^{(N_k)}_k \quad (15)$$

Note: $\Delta E_k$ is always less than the Equivalent Capacity ĉ, of the new connection i:

$$\Delta E_k \leq ĉ_i = f(R_i, m_i, b_i, X, \epsilon)$$

Note: if link k does not transport other connections issued from port p ($M_k = B_k 0$), then $\Delta E_k$ is equal to $ĉ_i = f(R_k, m_i, b_i, X, \epsilon)$.

Figure 13:
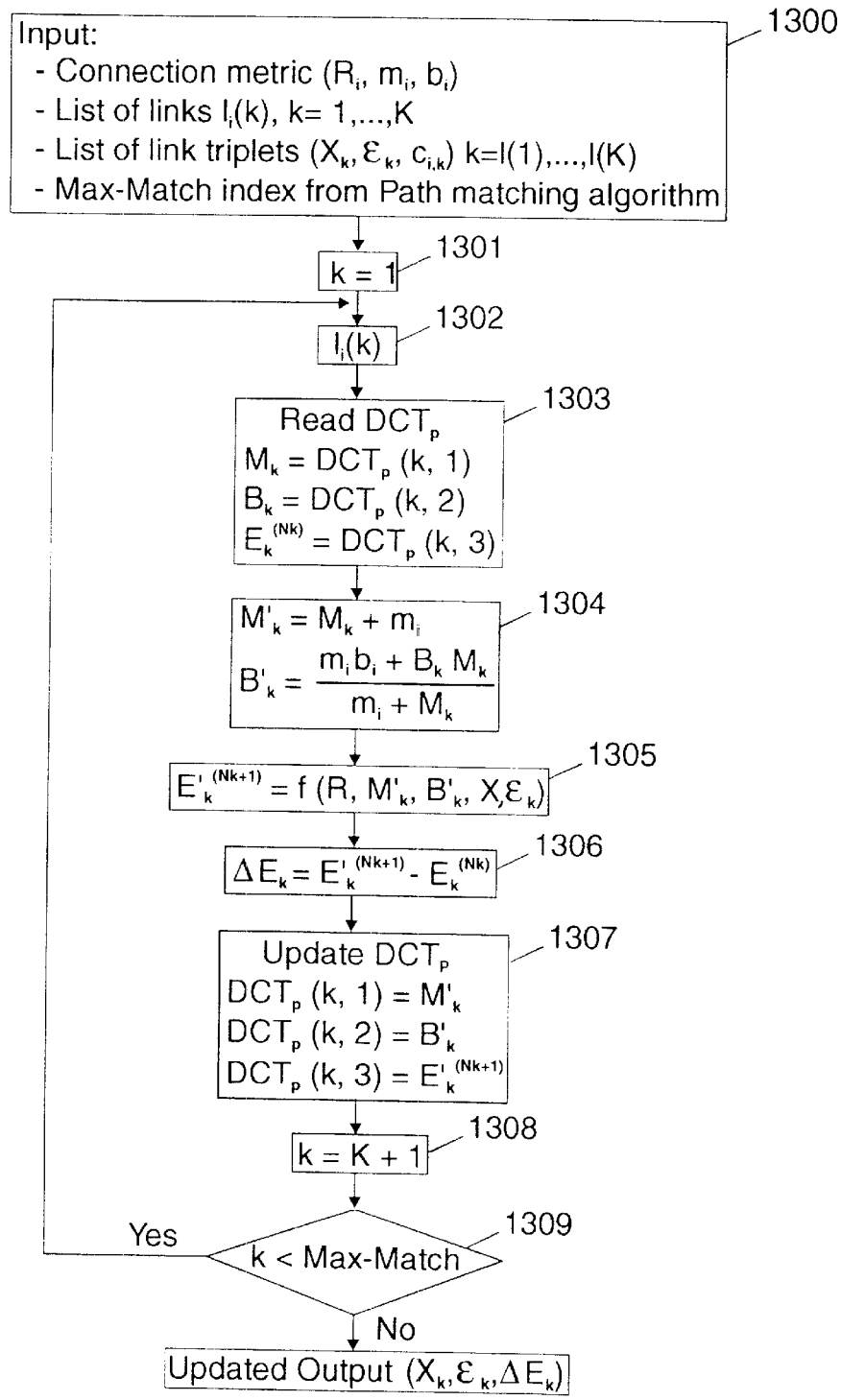
FIG. 13 is a flow chart of the Connection Aggregation algorithm according to the present invention.

FIG. 13 is a flow chart of the Connection Aggregation algorithm according to the present invention:

(1300) The Aggregation Algorithm is based on:
the connection metric of the new connection i ($R_i$, $m_i$, $b_i$)
the list of links k along the previously selected path.
the triplet ($X_k$, $\epsilon_k$, $ĉ_{i,k}$) for each link k along the selected path.
the MAX_MATCH value resulting from the Path Matching algorithm.

(1301) Variable k is set to one. The first link of the selected path is selected.

(1302) The kth link of the selected path is selected.

(1303) $M_k$, $B_k$ and $E^{(N_k)}_k$ are read in the Dependent Connection Table $DCT_p$ at the entry corresponding to link k:
$M_k = DCT_p(k,1)$
$B_k = DCT_p(k,2)$
$E^{(N_k)}_k = DCT_p(k,3)$ (1304) The mean bit rate $M'_k$ and the mean burst duration $B'_k$ of the connection i aggregated to the $N_k$ connections issued from port p and already established on link k are computed:

$$M'_k = M_k + m_i$$

$$B'_k = = \frac{m_i \times b_i + B_k M_k}{m_i + M_k}$$

(1305) The Equivalent Capacity required on link k when the additional connection i is added is computed:

$$E'^{(N_k+1)}_k = f(R, M'_k, B'_k, X, \epsilon)$$

(1306) The increase of the Equivalent Capacity is computed:

$$\Delta E_k = E'^{(N_k+1)}_k - E^{(N_k)}_k$$

(1307) The Dependent Connection Table $DCT_p$ is updated
$DCT_p(k,1) = M'_k$
$DCT_p(k,2) = B'_k$
$DCT_p(k,3) = E'^{(N_k+1)}_k$ (1308) The variable k is incremented to select the next link shared among dependent connections:
k=k+1

(1309) A test determines whether the variable k is lower or equal to MAX_MATCH or not:
If k is lower or equal to MAX_MATCH the aggregation algorithm goes on with step (1302).
If k is higher than MAX_MATCH the aggregation is completed. The connection message will include a triplet ($X_k$, $\epsilon_k$, $\Delta E_k$) for each link k consecutively shared among dependent connections.

CONCLUSION

The management of dependent connections takes advantage of the fact that it is not necessary to reserve more bandwidth than the port access rate for connections issuing from a same port. According to the present invention, the Path Selection algorithm is not involved in the management of dependent connections which simplifies the path selection algorithm and minimizes the time necessary for establishing connections. Furthermore, the claimed method and system does not imply the definition of a new type of connection set-up message and thus does not require any particular adaptation in transit nodes. Consequently, nodes supporting the present invention can inter-operate with existing nodes and the invention can smoothly and easily be introduced in existing networks (such as NBBS—Networking BroadBand Services).

When a new connection request is received, a path is first selected and then, dependent connections are managed. Compared with U.S. Pat. No. 97131, the path selection algorithm is no more optimal in that the path is selected a priori without taking any benefit of the dependency of the connections for choosing the best route. Furthermore, only a limited number of links (set of consecutive links along the selected path starting from the origin node) are selected by the path matching and connection aggregation mechanism. In reality, this drawback is not so important because most dependent connections are concentrated on links around the origin node. The closer to the origin node links are, the higher the probability to find dependent connections is.

The present Dependent Connection Management is not limited to a specific protocol such as Frame Relay (FR) but can be used to improve any service offering that uses a shared access medium, like ATM.

What is claimed is:

1. A method of sharing reserved bandwidth among several connections issuing from a same physical port in an origin node of a packet switching communication network comprising a plurality of nodes (201 . . . 208) interconnected with transmission links (209), said method characterized in that at each request for establishing a connection i from an origin node to a destination node it involves the steps of:

selecting for connection i a routing path comprising one or a plurality of links from the origin node to the destination node;

identifying on the selected path all consecutive links starting from the origin node and shared with another connection issuing from the same physical port;

reserving on each link of said identified consecutive links an aggregate bandwidth for all connections issuing from the same physical port, said aggregate bandwidth being less than the sum of the bandwidth reserved for each connection considered individually.

2. The method as recited in claim 1, wherein the step of identifying all consecutive links comprises the further step of defining for each port:

a Dependent Connection Table $DCT_p$ comprising for each link in the network, information required to manage the bandwidth and the dependency of connections issuing from the port;

a Path Table $PT_p$ with the links comprised in the selected routing path of each connection issuing from the port.

3. The method as recited in claim 1, wherein the aggregate bandwidth for all connections issuing from a same port with a given access rate does not exceed said port access rate.

4. The method as recited in claim 1, wherein the bandwidth reserved for each connection i considered individually is equal to an equivalent capacity, function of:

$R_i$ the access bit rate of said connection, $m_i$ the average bit rate of said connection, $b_i$ the average burstiness of said connection.

5. The method according to claim 4 wherein the bandwidth reserved for each connection i considered individually is equal to:

$$\hat{c}_i = f(R_i, m_i, b_i, X, \varepsilon) = R_i \frac{y_i - X + \sqrt{[y_i - X]^2 + 4X\rho_i y_i}}{2y_i}$$

where:

X is the buffer size where packets are queued while waiting transmission on the trunk.

$\varepsilon$ is the proportion of packets that can be lost due to the buffer overflowing.

$y_i = \ln(1/\varepsilon) b_i (1-p_i) R_i$.

$p_i = m_i / R_i$.

6. The method as recited in claim 1, wherein the aggregate bandwidth on link k for all $N_k$ connections issuing from a same physical port p is a function of:

$M_k$ the mean bit rate of the aggregation of the $N_k$ connections issued from said port, $B_k$ the mean burst duration of the aggregation of the $N_k$ connections issued from said port.

7. The method according to claim 6 wherein the mean bit rate of the aggregation of the $N_k$ connections issued from port p is equal to:

$$M_k = \sum_{i=1}^{N_k} m_i$$

the mean burst duration of the aggregation of the $N_k$ connections issued from port p is equal to:

$$B_k = \frac{\sum_{i=1}^{N_k} m_i \times b_i}{\sum_{i=1}^{N_k} m_i}$$

where $m_i$ is the average bit rate of connection i, $b_i$ is the average burstiness of connection i.

8. The method according to claim 7 wherein the aggregate bandwidth on link k for all N connections issuing from a same physical port p is equal to:

$$\hat{E}_k^{(N_k)} = f(R, M_k, B_k, X, \varepsilon) = R \frac{Y_k - X + \sqrt{[Y_k - X]^2 + 4X\rho_k Y_k}}{2Y_k}$$

where:

R is the port access rate, $Y_k = \ln(1/\varepsilon) B_k (1-p_k) R$, and $p_k = M_k / R$.

9. The method as recited in claim 1, wherein the step of reserving on a link an aggregate bandwidth for all connections issuing from a same physical port is processed only on said identified consecutive links.

10. A system for carrying out the method according to anyone of the preceding claims.

* * * * *